Patented Feb. 5, 1952

2,584,325

UNITED STATES PATENT OFFICE 2,584,325

PURIFICATION OF ALCOHOLS

Bertram E. V. Bowen and John Howlett, Tonbridge, England, assignors to The Distillers Company Limited, Edinburgh, Scotland, a British company No Drawing. Application August 7, 1948, Serial No. 43,156. In Great Britain August 25, 1947

9 Claims. (Cl. 260—643)

This invention relates to the purification of aliphatic alcohols and refers in particular to the purification of such alcohols as have been prepared by the sulphation of olefines and subsequent hydration.

A large industry has been developed for the production of aliphatic alcohols such as ethanol, ispropanol and the like by the treatment of olefines, obtained for example by the thermal decomposition of mineral oils or from petroleum refinery gases, with sulphuric acid and the subsequent hydration of the resulting sulphuric acid esters. The alcohols thus produced suffer from the great disadvantage that they contain small quantities of impurities with very objectionable odour and that these malodorous substances of more or less unknown composition are very difficult to remove by ordinary chemical or physical processes.

In U. S. patent specification No. 2,356,689, it has been suggested to treat aliphatic alcohols obtained by the sulphation of olefines with solid cuprous chloride as a means of stabilising them and improving their odour. The belief is expressed in this specification that the action of cuprous chloride is particular and specific.

This invention is based on the discovery that the deodorisation of malodorous substantially neutral aliphatic alcohols of the above mentioned kind may be carried out effectively by means of cuprous oxide and that the use of this substance offers the additional advantage that mild steel which is a cheap material for constructing the equipment in which to carry out the process, is not attacked by it whilst the use of cuprous chloride leads easily to corrosion.

According to the present invention the process for improving the odour of such lower aliphatic alcohol, prepared by the treatment of the corresponding olefine with sulphuric acid comprises contacting the alcohol with cuprous oxide. The amount of the said cuprous oxide used preferably comprises about 0.5 to 1.5% by weight of the alcohol treated.

This treatment of the alcohol can be effected in various ways for example by mixing the alcohol to be treated with a small amount of the cuprous oxide in a powdered or granular form and agitating the mixture for a sufficient time to effect the deodorisation of the alcohol, which is usually about 1 hour, and then separating the alcohol by decantation after settlement of the mixture, by filtration or by distillation. The agitation of the cuprous oxide—alcohol mixture can be effected by mechanical agitation—such as stirring—or by refluxing the mixture in a still, in the latter case the purified alcohol can be distilled off directly from the mixture without separation of the cuprous oxide.

Since cuprous oxide is insoluble in water, an alternative method of carrying out the process is to pass the alcohol to be treated through a static layer or bed, suitably contained in a tower or column, of cuprous oxide in a granular condition or admixed with or impregnated on an inert material such as clay, a ceramic material, bauxite or the like.

The alcohol to be treated can be either admixed with water or substantially anhydrous although in some cases where the alcohol contains a large quantity of water it might be advantageous to remove the water either partly or completely.

It is preferred that the alcohols treated should be neutral in order to avoid any corrosion of the equipment used, and also that the alcohol should be partly purified—for example by removal of any higher boiling material present—before the treatment of the alcohol. This treatment of the alcohols may form the last step in the purification and production of high grade purity lower aliphatic alcohols suitably followed by a final distillation.

The lower aliphatic alcohol prepared by the treatment of the corresponding olefine with sulphuric acid to be treated according to the present invention is preferably ethyl alcohol or isopropyl alcohol.

The following examples illustrate the manner in which the process of the invention may be carried out.

Example 1

To a sample of ethyl alcohol/water azeotrope obtained from the sulphation of ethylene and containing approximately 93% by weight of ethyl alcohol was added 1.5% by weight of granulated cuprous oxide. The mixture was brought to the boil and refluxed for one hour and then the azeotrope taken overhead to the extent of 95% by volume of the charge, the remaining 5% constituting hold up in column and base for heating medium. The distillate not only had an excellent odour but also a "permanganate time" of 3 mins. in contrast to the original feed which not only had a foul odour but in which the colour of permanganate was instantaneously destroyed when tested in the accepted manner for "permanganate time."

Example 2

An ethyl alcohol-water azeotrope containing 93% by weight of ethyl alcohol and having a very bad odour, obtained from the sulphation of ethylene, was diluted with twice its weight of water and powdered cuprous oxide in an amount comprising 0.5% by weight of the ethyl alcohol present added thereto. This mixture was stirred for 30 minutes, filtered, and the filtrate distilled, to give a fraction comprising 93% by weight ethyl alcohol. The purified ethyl alcohol had an excellent odor and a permanganate time of 2-3 minutes.

*Example 3*

A sample of isopropyl alcohol obtained from the sulphation of propylene having a very bad odour was admixed with finely ground cuprous oxide, in an amount approximately 1.5% by weight of the alcohol, and the mixture refluxed for one hour. The isopropyl alcohol was then distilled off, and the product was found to have an excellent odour.

We claim:

1. In a process for the purification of a lower aliphatic alcohol prepared by the treatment of the corresponding olefine with sulfuric acid, the step for improving the odour of the alcohol which comprises contacting substantially neutral malodorous alcohol with solid cuprous oxide.

2. In a process for the purification of ethyl alcohol prepared by the treatment of ethylene with sulphuric acid, the step for improving the odour of the alcohol which comprises contacting substantially neutral malodorous alcohol with solid cuprous oxide.

3. In a process for the purification of isopropyl alcohol prepared by the treatment of propylene with sulphuric acid, the step for improving the odour of the alcohol which comprises contacting substantially neutral malodorous alcohol with solid cuprous oxide.

4. In a process for the purification of a lower aliphatic alcohol prepared by the treatment of the corresponding olefine with sulphuric acid, the step for improving the odour of the alcohol which comprises mixing the substantially neutral malodorous alcohol with comminuted cuprous oxide, agitating the mixture for a sufficient time to sweeten the alcohol and then separating the treated alcohol.

5. In a process for the purification of lower aliphatic alcohols prepared by the treatment of the corresponding olefine with sulphuric acid, the step for improving the odour of the alcohol claimed in claim 4 wherein the said comminuted cuprous oxide is used in an amount comprising from 0.5 to 1.5% by weight of the alcohol treated.

6. In a process for the purification of lower aliphatic alcohols prepared by the treatment of the corresponding olefine with sulphuric acid, the step for improving the odour of the alcohol which comprises mixing with the substantially neutral malodorous alcohol solid cuprous oxide, in an amount comprising 1.5% by weight of the alcohol, refluxing the mixture for 1 hour and then distilling off the treated alcohol.

7. In a process for the purification of lower aliphatic alcohols prepared by the treatment of the corresponding olefine with sulphuric acid, the step for improving the odour of the alcohol which comprises mixing with the substantially neutral malodorous alcohol twice its weight of water and comminuted cuprous oxide, in an amount comprising 0.5% by weight of the alcohol, stirring the mixture for half an hour, separating off the said cuprous oxide and distilling the treated alcohol.

8. In a process for the purification of lower aliphatic alcohols prepared by the treatment of the corresponding olefine with sulphuric acid, the step for improving the odour of the alcohol which comprises passing the substantially neutral malodorous alcohol through a static layer of a solid material comprising cuprous oxide.

9. In a process for the purification of a lower aliphatic alcohol prepared by the treatment of the corresponding olefine with sulphuric acid, the step for improving the odour of the alcohol which comprises contacting a preformed solid cuprous oxide with malodorous alcohol.

BERTRAM E. V. BOWEN.
JOHN HOWLETT.

REFERENCES CITED

The following references are of record in the file of this patent:

UNITED STATES PATENTS

| Number | Name | Date |
|---|---|---|
| 2,227,485 | Bump | Jan. 7, 1941 |
| 2,356,689 | Ozol | Aug. 22, 1944 |

OTHER REFERENCES

Thorpe: "Dictionary of Applied Chemistry," 4th edition, vol. 3, page 354, Longman, Green, publisher.